(12) United States Patent  
Li et al.

(10) Patent No.: US 12,353,743 B2  
(45) Date of Patent: Jul. 8, 2025

(54) STORAGE METHOD, STORAGE DEVICE AND STORAGE SYSTEM

(71) Applicant: SAMSUNG ELECTRONICS CO., LTD., Suwon-si (KR)

(72) Inventors: Yufang Li, Xi'an (CN); Hao Yan, Xi'an (CN); Lijuan Xue, Xi-an (CN); Sha Shi, Xi'an (CN); Wenbin Cao, Xi'an (CN)

(73) Assignee: Samsung Electronics Co., Ltd. (KR)

( * ) Notice: Subject to any disclaimer, the term of this patent is extended or adjusted under 35 U.S.C. 154(b) by 190 days.

(21) Appl. No.: 17/706,077

(22) Filed: Mar. 28, 2022

(65) Prior Publication Data

US 2023/0024734 A1   Jan. 26, 2023

(30) Foreign Application Priority Data

Jul. 15, 2021 (CN) .......................... 202110799890.7

(51) Int. Cl.
*G06F 3/06* (2006.01)

(52) U.S. Cl.
CPC .......... *G06F 3/0643* (2013.01); *G06F 3/0608* (2013.01); *G06F 3/0641* (2013.01); *G06F 3/0659* (2013.01); *G06F 3/067* (2013.01)

(58) Field of Classification Search
None
See application file for complete search history.

(56) References Cited

U.S. PATENT DOCUMENTS

| 9,448,924 | B2 * | 9/2016 | Sundaram | G06F 3/0688 |
|---|---|---|---|---|
| 9,836,229 | B2 * | 12/2017 | D'Sa | G06F 3/0626 |
| 10,372,681 | B2 | 8/2019 | Asmussen et al. | |
| 10,445,022 | B1 | 10/2019 | Qui et al. | |
| 10,496,371 | B2 | 12/2019 | Li et al. | |
| 11,537,582 | B2 | 12/2022 | Xue et al. | |
| 2017/0212680 | A1 * | 7/2017 | Waghulde | G06F 3/0616 |
| 2018/0349095 | A1 | 12/2018 | Wu et al. | |

(Continued)

FOREIGN PATENT DOCUMENTS

| CN | 106682184 A | 5/2017 |
|---|---|---|
| CN | 109522283 A | 3/2019 |

(Continued)

OTHER PUBLICATIONS

Siying Dong, Optimizing Space Amplification in Rocksdb, Menlo Park, CA, USA.

(Continued)

*Primary Examiner* — Michael Alsip
(74) *Attorney, Agent, or Firm* — Fish & Richardson P.C.

(57) ABSTRACT

A storage method includes determining layers that are to be merged in a database; determining a data block that is to be modified based on files of the layers that are to be merged in the database; reading a corresponding data block in the memory and reorganizing the read data block, according to a key corresponding to the data block that is to be modified; replacing the data block that is to be modified in the memory with the reorganized data block, when byte size of the reorganized data block does not exceed a first preset value; and storing the key and statistical information of the reorganized data block in a corresponding file of the database.

17 Claims, 10 Drawing Sheets

(56) References Cited

U.S. PATENT DOCUMENTS

2020/0019331 A1  1/2020  Ren et al.
2020/0285399 A1  9/2020  Yang et al.

FOREIGN PATENT DOCUMENTS

| CN | 110007860 A | 7/2019 |
| CN | 111095187 A | 5/2020 |
| CN | 111475507 A | 7/2020 |
| CN | 113094372 A | 7/2021 |

OTHER PUBLICATIONS

Dostoevsky: Better Space-Time Trade-Offs for LSM-Tree Based Key-Kaule Stores Via Adaptive Removal of Superfluous Merging, SIGMOD '18: Proceeding of The 2018 International Conference on Managemnt of Data, May 2018, 505-520.
Highlights of odcc open data center summit in 2009 (http://www.odcc.org.cn/news/p-1160060784686317569.html).
Mei et al., "SSDKV:a fast key-value system based on SSD devices," Computer Engineering & Science, Jul. 2016, 38(7):1299-1308 (with English Abstract).
Office Action in Chinese Appln. No. 202110799890.7, mailed on Nov. 29, 2023, 12 pages (with English translation).

\* cited by examiner

STORAGE METHOD, STORAGE DEVICE AND STORAGE SYSTEM

CROSS-REFERENCE TO RELATED APPLICATION

This U.S. nonprovisional patent application is based on and claims priority under 35 U.S.C. § 119 to Chinese Patent Application No. 202110799890.7, filed on Jul. 15, 2021, in the Chinese Patent Office, the disclosure of which is incorporated by reference herein in its entirety.

TECHNICAL FIELD

The present disclosure relates to data storage technology, and more specifically, to a storage method, a storage device, and a storage system.

BACKGROUND

At present, storing and accessing hundreds of petabytes (PB) of data presents a large challenge. The open source RocksDB is a database used to store and access hundreds of petabytes (PB) of data. The RocksDB is an open storage database of Facebook and is an embedded Key-Value (KV) database written in C++. The RocksDB stores data using a Log Structured Merge (LSM) storage engine, in which the data exists in a form of a Sorted Sequence Table (SST) file on a storage apparatus.

However, in the related technology for RocksDB, change of a data block during a compaction process will affect a data structure of a subsequent data block in the SST file, and even affect a data structure of a data block of a next file. This leads to duplication and duplicated handling of a large amount of existing and unchanged data, which greatly increases write amplification.

SUMMARY

The present disclosure provides a storage method, a storage device, and a storage system to at least solve the above-mentioned problems in the related art.

According to an aspect of the present disclosure, a storage method includes determining layers that are to be merged in a database; determining a data block that is to be modified based on files of the layers that are to be merged in the database; reading a corresponding data block in the memory and reorganizing the read data block, according to a key corresponding to the data block that is to be modified; replacing the data block that is to be modified in the memory with the reorganized data block, when a byte size of the reorganized data block does not exceed a first preset value; and storing the key and statistical information of the reorganized data block in a corresponding file of the database.

According to another aspect of the present disclosure, a computer-readable storage medium stores a computer program. The computer program, when executed by a processor, implements some or all aspects of the storage method described above.

According to another aspect of the present disclosure, at least one memory stores computer-executable instructions. The computer-executable instructions, when executed by at least one processor, cause the at least one processor to execute one or more aspects of the storage method described above.

According to an aspect of the present disclosure, a storage device includes: a first determination unit configured to determine layers that are to be merged in a database; a second determination unit configured to determine a data block that is to be modified based on files of the layers that are to be merged; a reorganization unit configured to read a corresponding data block in the memory and to reorganize the read data block, according to a key corresponding to the data block that is to be modified; a replacement unit configured to replace the data block that is to be modified in the memory with the reorganized data block, when a byte size of the reorganized data block does not exceed a first preset value; and a writing unit configured to store the key and statistical information of the reorganized data block in a corresponding file of the database.

According to an aspect of an exemplary embodiment of the present disclosure, a storage system includes a memory, a database, and the storage device described above. The memory is configured to store the data block and the reorganized data block, and the database is configured to store the key and the statistical information of the reorganized data block.

A storage method and a storage device are provided by using the technical solutions of the present disclosure, in which data blocks originally stored in the file of the database are stored in the memory, and only information related to the data blocks is stored in the file of the database for subsequent calls and reorganization. Because the size of the data blocks stored in the memory is variable, the size of the data blocks is no longer fixed as when the data blocks are stored in the database, so that the byte size of the data blocks can be changed within a certain range. Thus the data blocks corresponding to the files in the database are made to be variable in length.

In the following description, additional aspects and/or advantages of the general concept(s) of the present disclosure will be explained, some of them will be clear through the description, or may be learned through the implementation of the general concept(s) of the present disclosure.

BRIEF DESCRIPTION OF THE DRAWINGS

The above and other objectives and features of exemplary embodiments of the present disclosure will become clearer through the following description in conjunction with the accompanying drawings that exemplarily show the embodiments, in which.

DETAILED DESCRIPTION

The following specific implementations are provided to help readers gain a comprehensive understanding of the method, device, and/or system described herein. However, after understanding the disclosure of the present application, various changes, modifications and equivalents of the method, device and/or system described herein will be clear. For example, the order of operations described herein is only an example, and is not limited to those set forth herein, but may be changed as will be clear after understanding the disclosure of this application, except for operations that must occur in a specific order. In addition, for more clarity and conciseness, descriptions of features known in the art may be omitted. The features described herein can be implemented in different forms and should not be construed as being limited to the examples described herein. On the contrary, the examples described herein have been provided to illustrate only some of many possible ways of implementing the method, device, and/or system described herein, which will be clear after understanding the disclosure of this application.

The terms used here are only used to describe various examples and will not be used to limit the disclosure. Unless the context clearly indicates otherwise, the singular form is also intended to include the plural form. The terms "including", "comprising" and "having" indicate the presence of the stated feature, number, operation, component, element and/or combination thereof, but do not exclude the presence or addition of one or more other features, numbers, operations, components, elements and/or combinations thereof.

Unless otherwise defined, all terms (including technical terms and scientific terms) used herein have the same meanings as commonly understood by those of ordinary skill in the art to which the present disclosure belongs after understanding the present disclosure. Unless explicitly defined as such herein, terms (such as those defined in general dictionaries) should be interpreted as having meanings consistent with their meaning in the context of the relevant field and in the present disclosure, and should not be interpreted too formally.

In addition, in the description of the examples, when a detailed description of a well-known related structure or function may cause a vague interpretation of the present disclosure, such a detailed description may be omitted.

Figure 1:
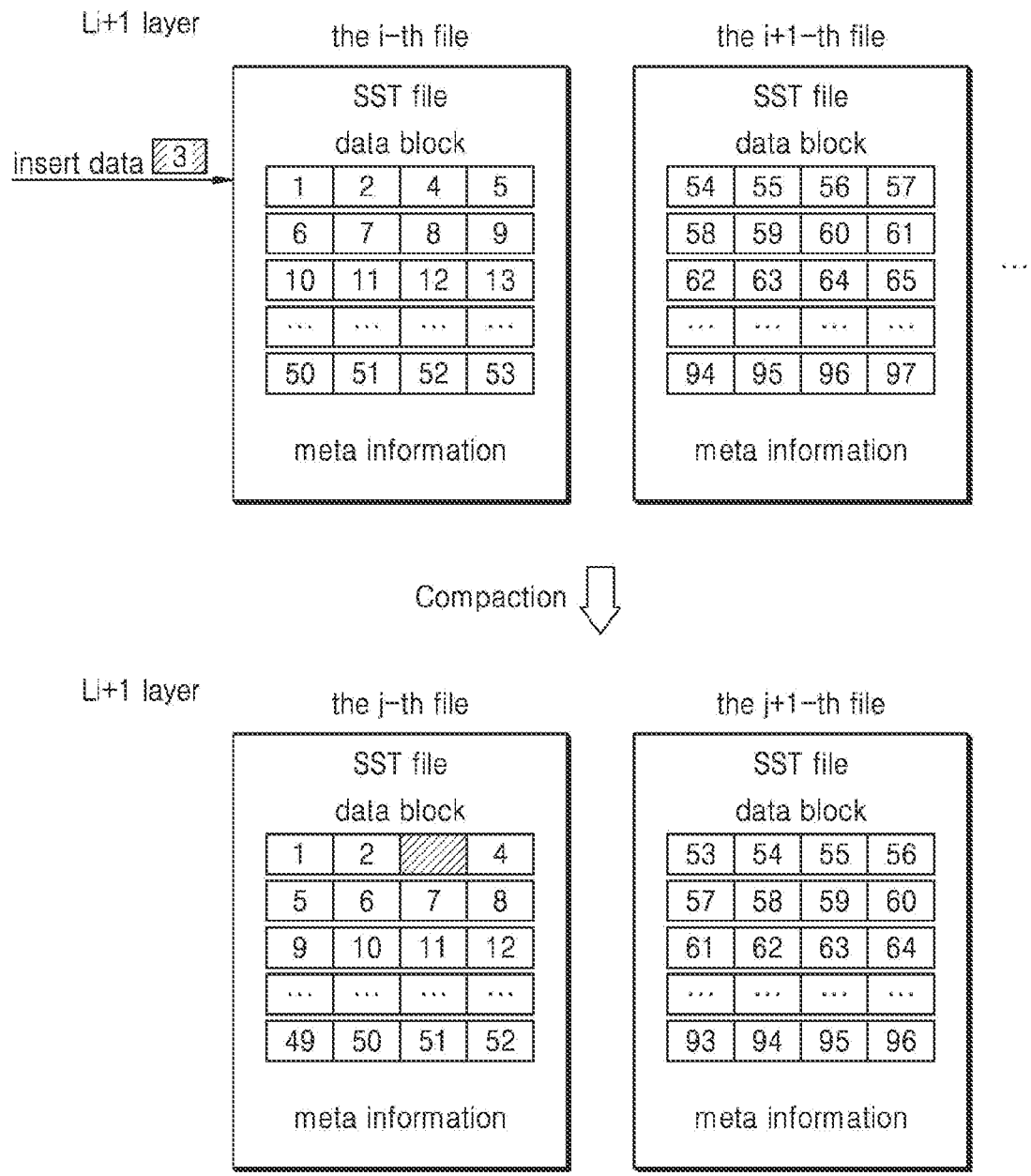
FIG. 1 is a schematic diagram illustrating inserting data in a Compaction process of the RocksDB in related technologies.

In the related technology, a data block of an SST file of the RocksDB is of a fixed size, generally 4K. The change of one data block in the SST file during the compaction process will affect the data structure of the subsequent data block in the SST file, and even affect the data structure of the data block(s) of the next file. As shown in FIG. 1, the i-th and i+1-th files of the Li+1 layer are selected to participate in the Compaction, and the data blocks in the i-th file are [1 2 4 5], [6 7 8 9], [10 11 12 13] . . . [50 51 52 53], the data blocks in the i+1-th file are [54 55 56 57], [58 59 60 61], [62 63 64 65] . . . [94 95 96 97]. The SST file is in order. Data 3 should be inserted into the first data block of the i-th file. The first data block of the i-th file becomes [1 2 3 4], and since the block of the SST file is of a fixed size, data 5 appears in the second data block of the i-th file after reorganization, and so on. The last data of the i-th file may appear in the first data block of the i+1-th file, which causes the data of the i+1th file to change. Moreover, the Compaction process is in a unit of the SST file, that is, all files in the Li layer and Li+1 layer that participate in the Compaction will be read, parsed, sorted, reorganized, and rewritten.

Figure 2:
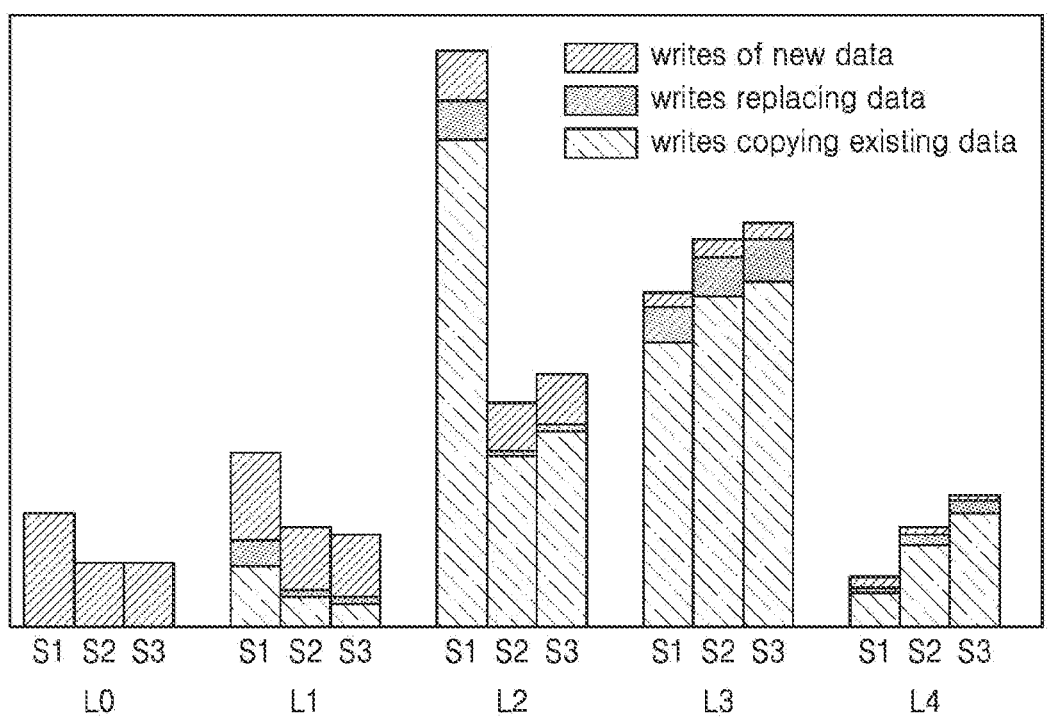
FIG. 2 is a schematic diagram illustrating a comparison of distributions of write operation types at each layer of a LSM-based database system.

FIG. 2 is a schematic diagram illustrating a comparison of distributions of write operation types at each layer of a LSM-based database system. The LSM-based database system in FIG. 2 includes three database systems labelled as S1, S2 and S3.

As shown in FIG. 2, through the analysis of write operations of disks of each layer of the three database systems based on Log Structured Merge (LSM), the data in the files in the L0 layer comes from the main memory, and the L0 layer only has new data. The files in the L1~L4 layers are generated by the Compaction operation, and consumption of write operations in the Compaction of the L1~L4 layer of the LSM-based database system mainly comes from the copy of a large number of existing and unchanged data, which greatly increases the write amplification.

Figure 3:
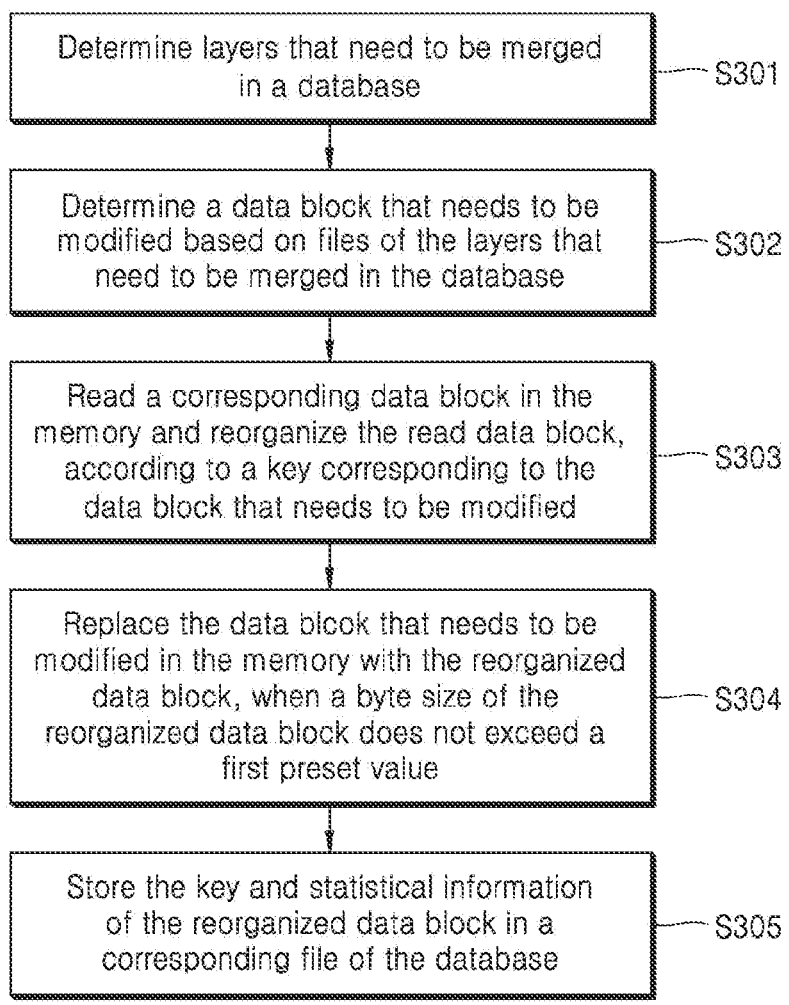
FIG. 3 is a flowchart illustrating a storage method, according to an exemplary embodiment of the present disclosure.

With respect to the above problem, according to an aspect of an exemplary embodiment of the present disclosure, a flowchart for a storage method is illustrated in FIG. 3, according to an exemplary embodiment of the present disclosure. The storage method is applied to a storage device, any may be performed as a storage process implemented partially or fully by an electronic apparatus.

In step S301, layers that need to be merged in a database are determined. The aforementioned database may be a key-value KV database. For example, the database may be the RocksDB. A database used in the storage method of FIG. 3 is not limited to the above-mentioned database.

In this embodiment of the present disclosure, the determining of the layers that need to be merged in the database may include detecting that the byte size of the files in the database increase, acquiring the byte size of each layer in the database, determining a former layer with a byte size that exceeds a byte threshold, and determining that the former layer and a latter layer need to be merged. The latter layer is a next layer adjacent to the former layer. The latter layer may be logically adjacent to the former layer through addressing and/or through the timing of when the latter layer and former layer were created, and/or may be physically adjacent in storage locations of the database. Through this embodiment, the Compaction operation may be triggered conveniently and quickly. The above byte threshold may be stored in statistical information of the data block of each layer.

For example, when the amount of the written data is detected to reach a certain value such as a first predetermined threshold, an SST file needs to be added to the database to store the written data. At this time, a byte size of each layer in the database may be obtained from statistical information. Each layer may have a byte threshold specific to the layer. In the case that a byte size of any layer exceeds a byte threshold of the layer, the layer with a byte size that exceeds the byte threshold of the layer is the Li layer, and the next layer adjacent to the layer is the Li+1 layer. Alternatively, the layer (i.e., the 0th layer of a logical tree) corresponding to the file to which the data is written is first determined, and the current total number of bytes in the 0th layer is first compared with the byte threshold of this layer.

In the case that the current total number of bytes is greater than the byte threshold of this layer, the 0th layer is the Li layer, and the next layer (that is, the 1st layer) adjacent to this layer is the Li+1 layer. After one compaction is completed, the current total number of bytes of the first layer continues to be judged based on the byte threshold of this layer. If the current total number of bytes is greater than the byte threshold of this layer, the 1st layer is the Li layer, and the next layer (i.e. the 2nd layer) adjacent to this layer is the Li+1 Layer. If the current total number of bytes is not greater than the byte threshold of this layer, compaction may be stopped.

In this embodiment, all the files of the Li layer and Li+1 layer participating in the merge may be deleted by a background thread at an appropriate time. An order of the deletion may be an order of the compaction or an order dynamically set according to needs.

In addition, after merging for the first time, the layers to be merged may also be determined as follows. When a part of the SST file needs to be deleted, the Li layer and Li+1 layer that need to be merged may also be determined according to the current total number of bytes of the layer corresponding to the deleted file and the byte threshold of the corresponding layer. Each layer in the database may have its own byte threshold, and the byte threshold can be dynamically set according to actual needs.

In this embodiment of the present disclosure, an increase in the size of the files in the database may be detected when the byte size of written data of any layer exceeds the first predetermined threshold for that layer. That is, based on the byte size of written data of a layer exceeding the first predetermined threshold for that layer, an increase in the size of the files in the database may be detected.

In step S302, a data block that needs to be modified is determined based on files of the layers that need to be merged in the database.

In an embodiment of the present disclosure, the determining of the data block that needs to be modified based on the files of the layers that need to be merged may include acquiring a file with a largest file byte size and a predetermined file in a former layer that need to be merged. The predetermined file is the file in the former layer containing a user key of the file with the largest file byte size, and the user key is contained in the key corresponding to the data block in the file. A user key range may be obtained based on the user key of the file with the largest file byte size and a user key of the predetermined file. A data block in a latter layer with a user key overlapped with the user key range may be acquired. A data block in the former layer with a user key overlapped with the user key range may be acquired. The data block with a user key overlapped with the user key range may be determined as the data block that needs to be modified. Through this embodiment, the data block that needs to be modified is determined according to the overlapping of the user key, which reduces the reorganization of irrelevant data blocks during a reorganization process.

For example, after the Li layer and Li+1 layer that need to be merged are determined, the files of the Li layer may be sorted according to the byte size to obtain the file with the first order, and the file with the first order may be compared with other files of the Li layer to obtain a file containing the user key of the file with the first order, that is, to obtain the above predetermined file. Then a user key range is obtained based on the user key of the file with the first order and a user key of the predetermined file. A data block with a user key overlapping the user key range in the files of the Li+1 layer file is queried. The data block with a user key overlapping with the user key range in the files of the Li layer is queried. The data block with a user key overlapped with the user key range is the data block that needs to be modified.

In step S303, the method of FIG. 3 includes reading a corresponding data block in the memory and reorganizing the read data block, according to a key corresponding to the data block that needs to be modified. The above-mentioned memory may be a solid state drive that directly supports KV storage. For example, the solid state drive may be a key-value solid state drive KV SSD. The memory is not limited to the above-mentioned solid-state hard disk, as long as the memory may store the data block and the byte size of the stored data block is variable, the memory may be applied in the present disclosure. The above-mentioned key may include, but is not limited to, the user key of the data block and a serial number. The serial number is used to indicate the order in which the same user key appears. The user key is user-oriented and is the key that the user needs to use when calling the data block.

In this embodiment of the present disclosure, the corresponding data block may be read in the memory and the read data block is reorganized according to the key corresponding to the data block that needs to be modified, as follows. The corresponding data block in the memory may be read according to a user key corresponding to the data block that needs to be modified. The user key is contained in the key corresponding to the data block. Data corresponding to a largest serial number corresponding to each user key may be selected from the corresponding data block. The serial number is contained in the key corresponding to the data block and is used to indicate an order in which the same user key appears. The selected data is used as the reorganized data block after being sorted according to the user key For example, the data block that needs to be modified may be read from the KV SSD according to the user key of the data block, and data corresponding to the same user key may be queried from the read data block. Only the data corresponding to the largest serial number in the data corresponding to the same user key may be retained. The data corresponding to other serial numbers is deleted, and then the retained data is sorted by the user key to form the reorganized data block.

In step S304, the data block that needs to be modified in the memory is replaced with the reorganized data block, when the byte size of the reorganized data block does not exceed a first preset value. Since the byte size of the data block is variable within a certain range, if the reorganized data block does not exceed the data block length threshold (such as a first preset value below), the data block that needs to be modified after being reorganized may be directly stored in a corresponding location of the memory. The data block that does not need to be changed may be retained in the KV SSD as it is, and meta information of the data block may be all that is required to be stored in a variable-length SST file. The above first preset value may be dynamically set according to actual needs.

In step S305, the key and statistical information of the reorganized data block are stored in a corresponding file in the database.

In these embodiments of the present disclosure, the reorganized data block may be split according to the first preset value, when the byte size of the reorganized data block exceeds the first preset value. The data block that needs to be modified in the memory is replaced with the split data block. That is, the reorganized data block is split according to the first preset value based on (e.g., conditioned upon, subject to) the byte size of the reorganized data block exceeding the first preset value. The storing of the key and statistical information of the reorganized data block in a corresponding file of the database includes storing the key and the statistical information of the split data block in the corresponding file of the database. Through these embodiments the byte size of the data block will not be too large.

For example, if the reorganized data block exceeds the data block length threshold (that is, the first preset value), the reorganized data block will be split into multiple data blocks according to the length threshold. The multiple data blocks are written into the KV SSD, and their corresponding meta information is stored in a variable-length SST file. The data block that does not need to be changed may be retained in the KV SSD as it is, and the meta information of the data block may be all that is required to be stored in the variable-length SST file. The above-mentioned splitting process uses the first preset value and the byte size of the reorganized data block. For example, assuming that the first preset value is 16 and the byte size of the reorganized data block is 33, the reorganized data block may be split into three data blocks with the size of 16, 16, and 1.

In this embodiment of the present disclosure, after the key and the statistical information of the reorganized data block are stored in the corresponding file of the database,
whether the byte size of all data blocks of the corresponding file exceeds a second preset value may be further judged. When a result of the judging is yes, the corresponding file is split according to the second preset value, and the key and the statistical information of the reorganized data block and the key and the statistical information of a unmodified data block of the corresponding file are stored respectively in the split file in the order of the keys. When the result of the judging is no, the key and the statistical information of the reorganized data block are stored in the corresponding file. The above-mentioned second preset value may be dynamically set according to actual needs. Thus, the manner of handling varies based on the result of the judging. Through this embodiment, the total byte size of the data blocks corresponding to one file will not be too large.

For example, if the total byte size of the data blocks corresponding to the variable-length SST file exceeds a certain range after storing the relevant information of the reorganized data block in the SST file, the variable-length SST file may be split into multiple files. For example, assuming that the second preset value is 100 and the byte size of the corresponding file is 103, the corresponding file may be split into two files with a size of 100 and 3. In this way, the byte size of the total data block corresponding to each file will not be too large.

Through the above-mentioned embodiment of the present disclosure, granularity is refined in the Compaction process, and the Compaction is performed in a unit of the data block rather than in the unit of the SST file. For the data block that is changed during the Compaction process, the data block is read, parsed, sorted, reorganized, and rewritten to make the data block variable in size within a certain range. The data block that has not been changed during the Compaction process is stored in the KV SSD as it is, and is not affected by the changed data block. This can reduce unnecessary operations and TO consumption, thereby reducing write amplification and improving write performance. Taking the database as the RocksDB and the storage as the KV SSD as an example, the Compaction process will be described in detail in conjunction with FIG. 4, FIG. 5, FIG. 6, FIG. 7, and FIG. 8.

Figure 4:
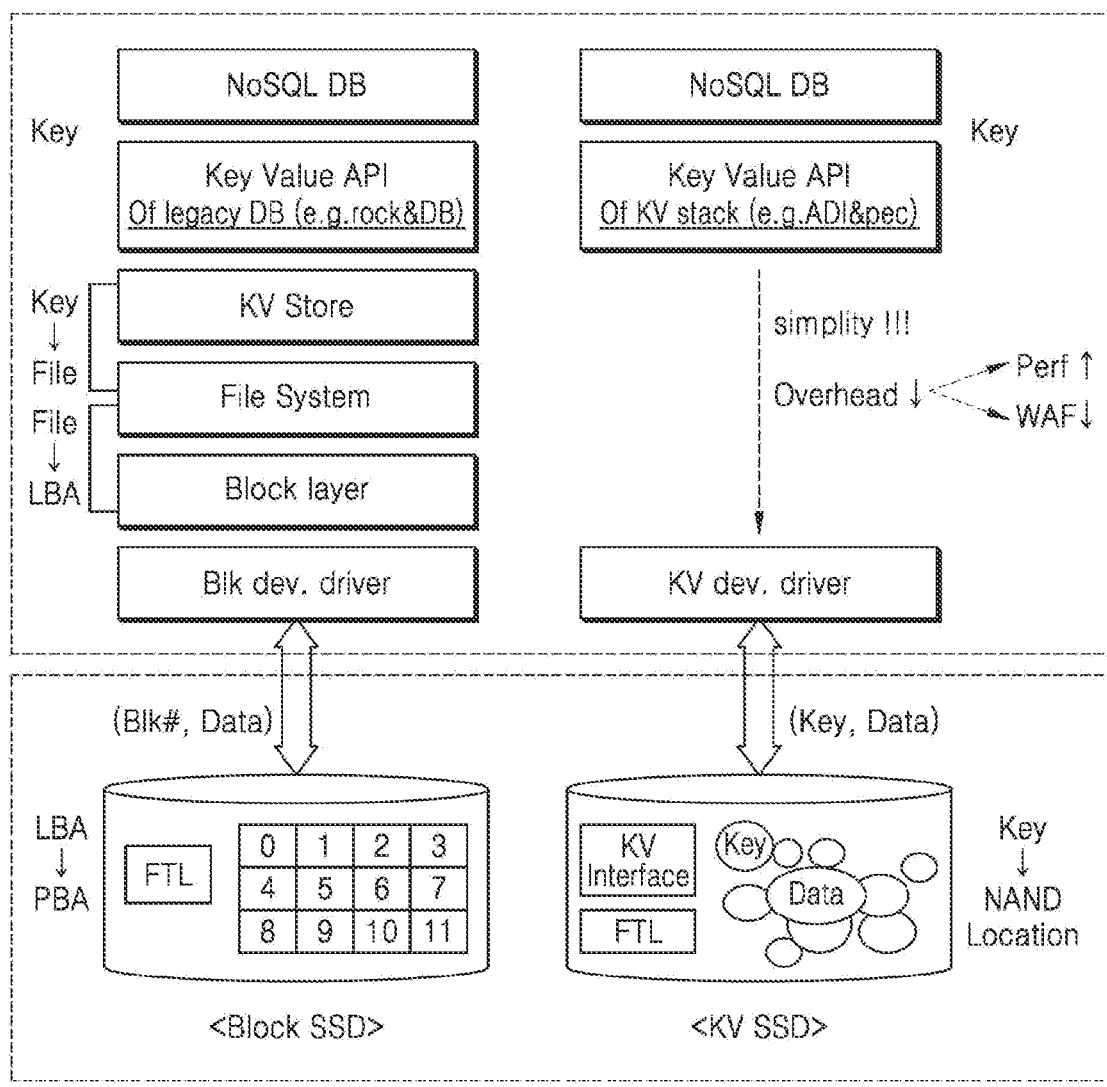
FIG. 4 is a schematic diagram illustrating a comparison of Block SSD and KV SSD architecture.

FIG. 4 is a schematic diagram illustrating the comparison of Block SSD architecture (as shown on the left) and KV SSD architecture (as shown on the right). As shown in FIG. 4, the KV SSD mentioned above is a new type of SSD and is an apparatus that can directly support the KV storage. With the Block SSD in the related technology, the writing and reading of the KV database needs to complete data conversion from KV to a file, the file to a logical block address (LBA for short), and then from LBA to a physical block address (PBA for short). However, the KV SSD adopts an enhanced Flash Translation Layer (FTL), which implements part of the core functions of the KV storage. The KV SSD provides a KV interface to the outside and can directly respond to a KV request from a host-side application. This simplifies the process of data reading and writing and thereby not only improves the efficiency of data reading and writing, but also greatly reduces the consumption of CPU and the memory on the host side.

Figure 5:
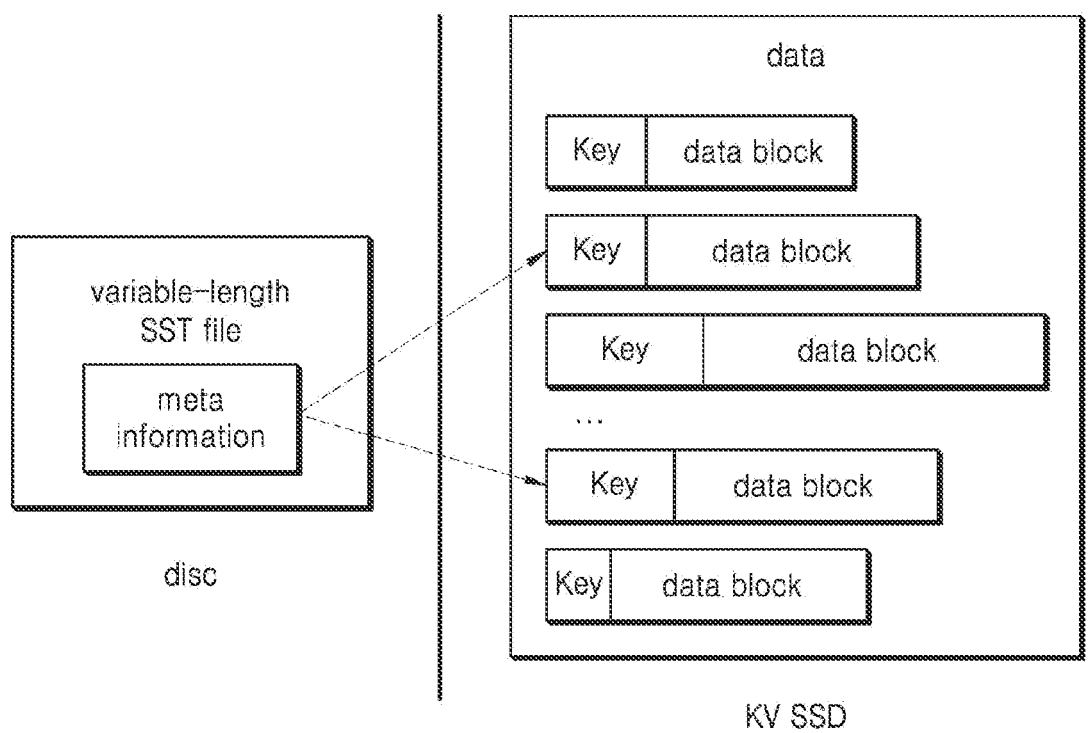
FIG. 5 is a first schematic diagram illustrating a format of an exemplary variable-length SST file, according to an exemplary embodiment of the present disclosure.

The use of KV SSD in conjunction with a KV storage engine or a KV database (such as the RocksDB) will bring greater improvement in many aspects. Therefore, the data blocks of SST files of the RocksDB may be stored in the KV SSD. For example, the read and write performance of the RocksDB may be ensured by using the advantage of the KV SSD. When the size of the data block changes within a certain range, the performance of the KV SSD randomly reading and writing data is stable, as shown in FIG. 5. The data blocks with variable byte lengths may be stored through the KV SSD, thereby realizing the variable-length SST file. As another example, the data blocks with variable byte lengths may be stored through the KV SSD, so that each data block in the SST file is independent of each other, and reading and writing do not affect each other. This is convenient for refining the granularity in the subsequent Compaction process.

Figure 6:
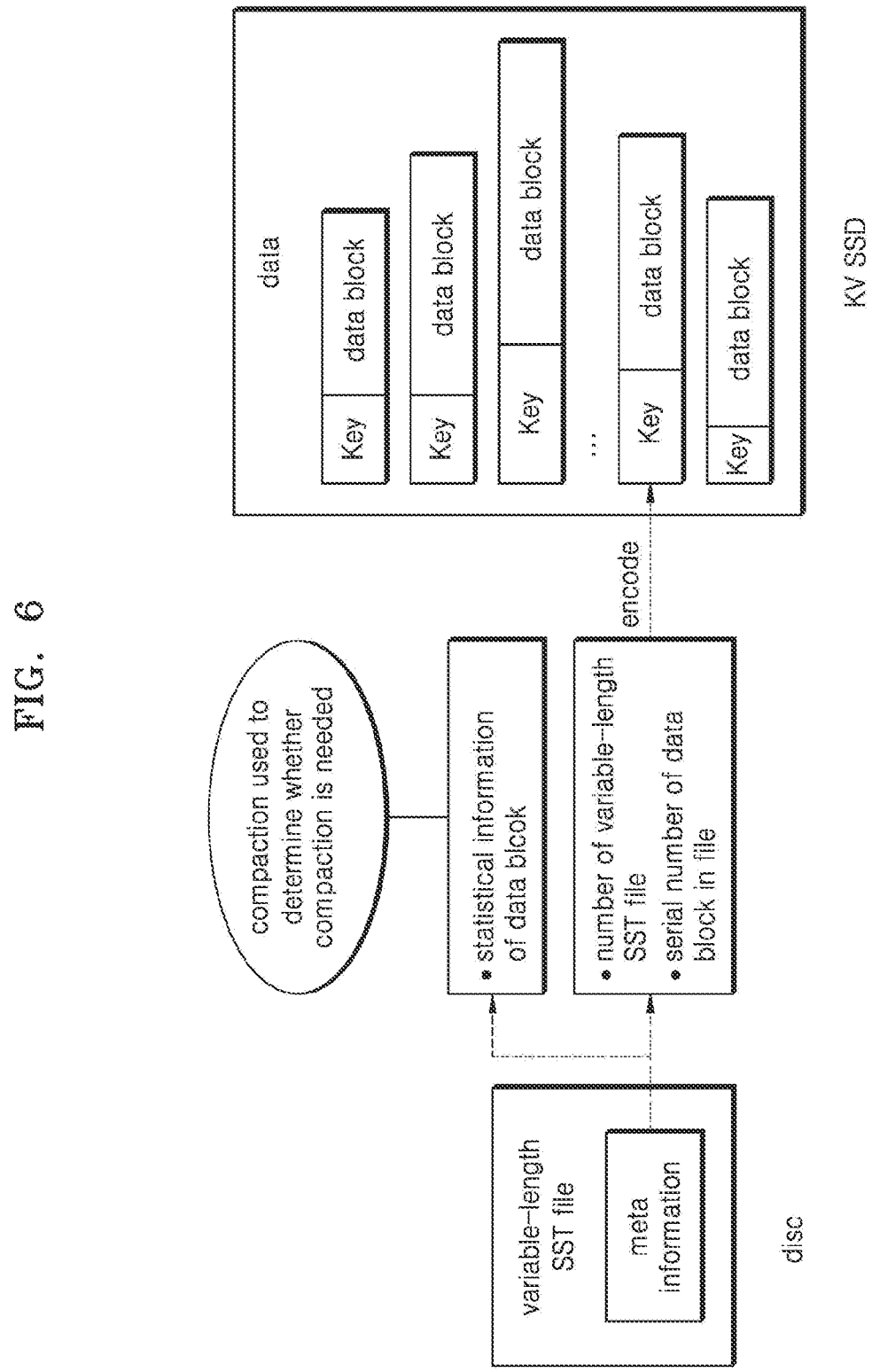
FIG. 6 is a second schematic diagram illustrating a format of an exemplary variable-length SST file, according to an exemplary embodiment of the present disclosure.

In this embodiment, the key corresponding to the data block and the statistical information of the data block described above may be stored in an index block of meta information of the file. That is to say, the data structure of the index block in the meta information may be expanded, and the key and the statistical information of the data block may be added, so that the key and the statistical information of the data block are stored conveniently and quickly on the basis of the original structure. Specifically, as shown in FIG. 6, the data structure of the data index block in the meta information in the SST file is expanded, so that relevant fields of the key in the KV SSD (file number of the SST file and serial number of data block in the SST file) and the statistical information of the data block are added on the original basis. Relevant fields of the key in the KV SSD and the statistical information of the data block can then be used in the process of reading from and writing to KV SSD and the Compaction respectively.

Figure 7:
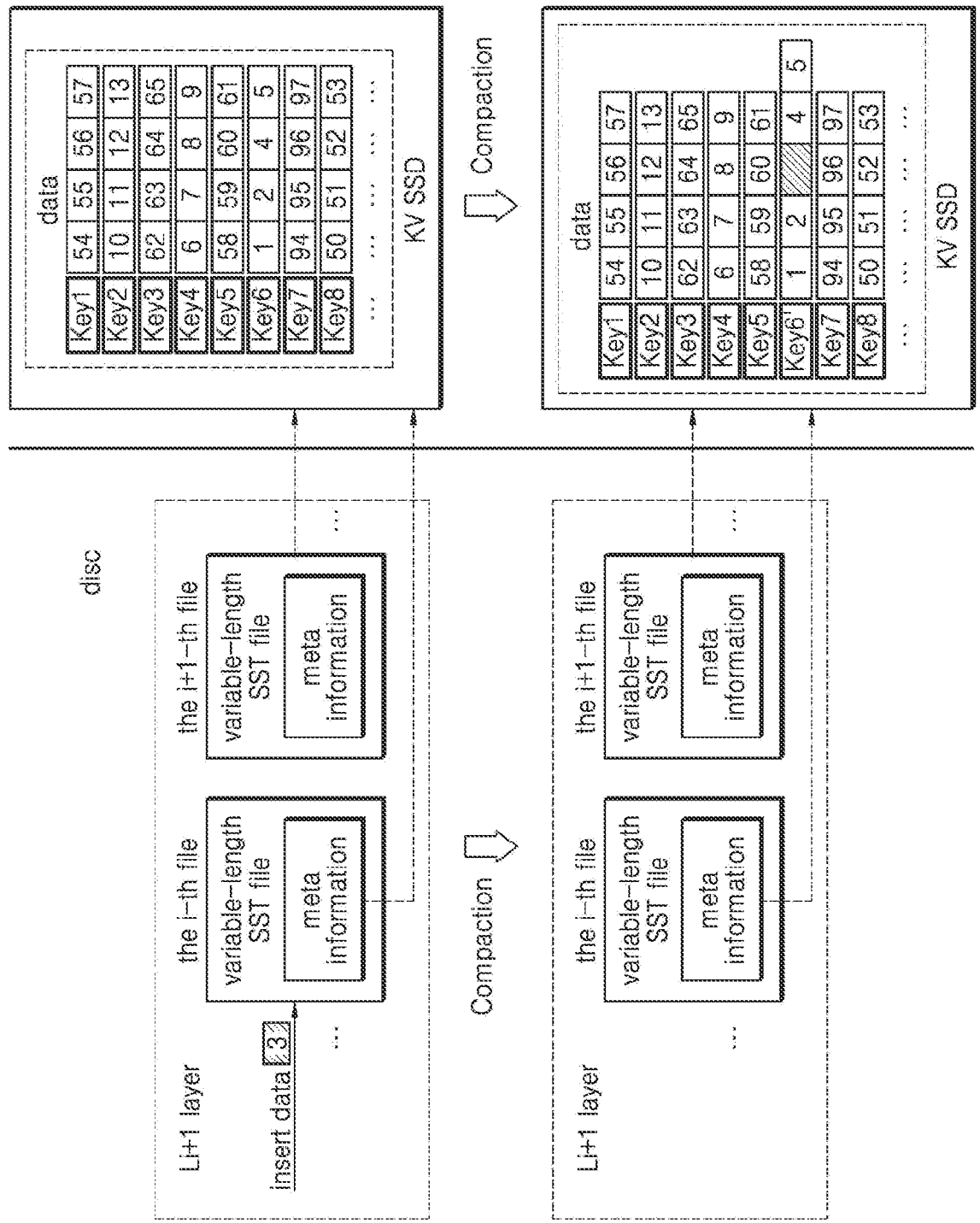
FIG. 7 is a schematic diagram illustrating inserting data in the Compaction process of the variable-length SST file, according to an exemplary embodiment of the present disclosure.

FIG. 7 is a schematic diagram illustrating inserting data during the Compaction process of a variable-length SST file, according to an exemplary embodiment of the present disclosure. As shown in FIG. 7, when data 3 needs to be inserted during the Compaction process, the data block [1 2 4 5] is changed to [1 2 3 4 5], and other data blocks remain unchanged.

Figure 8:
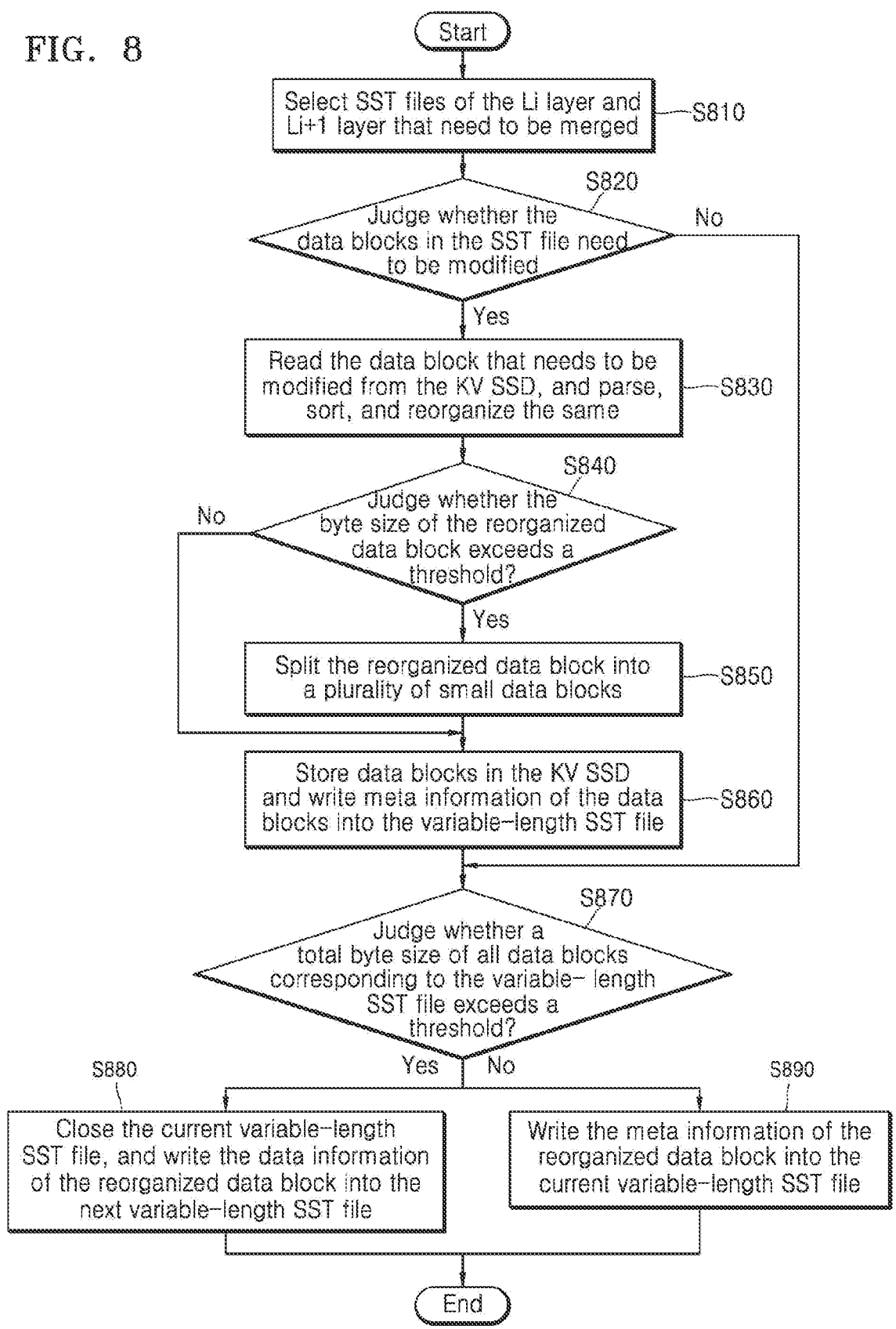
FIG. 8 is a flow chart illustrating the Compaction of the variable-length SST file based on the KV SSD, according to an exemplary embodiment of the present disclosure.

FIG. 8 is a flow chart illustrating the Compaction of the variable-length SST file based on the KV SSD, according to an exemplary embodiment of the present disclosure. As shown in FIG. 8, the Compaction process is as follows:

Firstly, at S810, the SST files of the Li layer and the Li+1 layer that need to be merged are selected. In this process, the byte size of the written data may be detected at first. When the byte size reaches a certain value (the first preset threshold described above), a determination may be made that an SST file has been added to the database based on the byte size reaching the certain value. At this time, a layer to which the data is written and the next layer adjacent to this layer are determined as the Li layer and Li+1 layer that need to be merged. The relationship between the current byte size of a layer corresponding to the added file and the byte threshold of the layer may also be monitored. When the current byte size of the layer corresponding to the added file is greater than the byte threshold of the layer, the layer corresponding to the added file and the next layer adjacent to the layer are used as the layer Li and the layer Li+1 that need to be merged.

Secondly, at S820, whether the data blocks in the SST file need to be modified is judged. In this process, the files in the Li layer are sorted by the byte size to obtain the file with the first order and the file (that is, the predetermined file described above) in the Li layer with a user key overlapping the user key of the file in the first order. A user key range is obtained based on the user key of the file with the first order and a user key of the predetermined file. The data block for which there is overlapping with the user key range in the Li+1 layer is queried and the data block for which there is overlapping with the user key range in the Li layer is queried. The data block for which there is overlapping with the user key range is determined as the data block that needs to be modified.

Furthermore, at S830, the data block that needs to be modified is read from the KV SSD, and parsed, sorted, and reorganized.

Then, at S840, whether the byte size of the reorganized data block exceeds the data block threshold (the first preset value described above) is judged, and the data block threshold may be stored in the statistical information of the data block.

Then, at S850, when the byte size of the reorganized data block exceeds the data block threshold (S840=Yes), the reorganized data block is split into several data blocks according to the data block threshold. Then at S860, several data blocks are stored in the KV SSD and relevant information of the several data blocks is written into the variable-length SST file. When the byte size of the reorganized data block does not exceed the threshold (S840=No), at S860 the reorganized data block is directly stored in the KV SSD and the relevant information of the reorganized data block is written to the variable-length SST file.

After completing the above operations, at S870, whether the total byte size of all data blocks corresponding to the variable-length SST file after writing exceeds the file threshold (the second preset value described above) is judged. If the total byte size exceeds the file threshold (the second preset value described above) (S870=Yes), the SST file is split into several files according to the file threshold. Alternatively, as shown in S880, when the total byte size exceeds the file threshold (S870=Yes), the current variable-length SST file may also be closed, and the meta information of the reorganized data block is written into the next variable-length SST file. If the file threshold is not exceeded (S870=No), at S890 the meta information of the reorganized data block is written into the current variable-length SST file.

All the files involved in the compaction described above will be deleted, and the reorganized data blocks will be stored in the files that are not involved in the compaction. For example, as mentioned above, the meta information of the reorganized data block may be written into the next variable-length SST file or may also be stored in the new SST file. After deleting the file, the current total number of bytes in the corresponding layer is recalculated, and is compared with the byte threshold of this layer to obtain the comparison result in order to be used for the next compaction.

Figure 9:
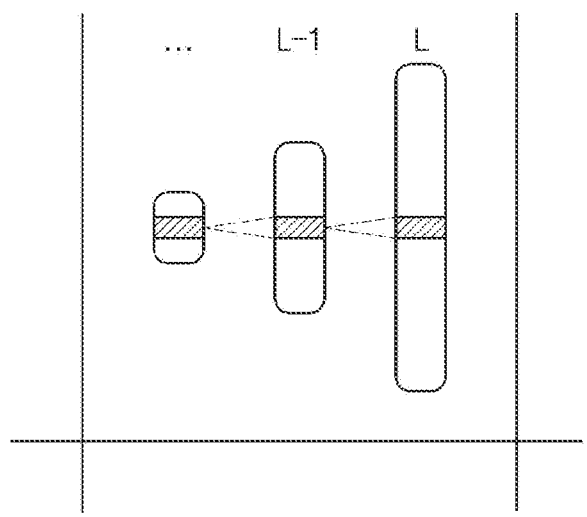
FIG. 9 is a schematic diagram illustrating the Compaction process in the worst case of an LSM-based database system, according to an exemplary embodiment of the present disclosure.

In order to verify the effectiveness of the above embodiments, the present disclosure illustrates the situation of the above embodiments to reduce the compaction write amplification by calculating the write amplification of the LSM storage engine in the Compaction process, taking the Compaction in the worst case as an example. In the worst case, the file in the L0 layer falls to and until the last layer through the Compaction. Basic definitions that need to be used are given in Table 1, and the Compaction process in the worst case of the LSM-based database system is shown in FIG. 9.

TABLE 1

Basic definitions

| item | definition | unit |
| --- | --- | --- |
| N | the number of data blocks in an SST file | number |
| T | times of the total data amount between each layer | |
| L | The number of layers of a LSM tree | |

The files of the L0 layer reach a trigger condition of the Compaction, and they are compacted with the files of the L1 layer. The data of the L0 layer falls to the L1 layer. According to the characteristics of the LSM tree, the total capacity of the next layer is T times the total capacity of the previous layer. In the worst case, the L0 layer needs to be performed T times of the Compaction with the L1 layer, and then the data of the L1 layer will meet the condition of the Compaction of the L2 layer and fall to the L2 layer. In the same worst case, the L1 layer needs to be performed T times of the Compaction with the data of the L2 layer and then the condition of the Compaction of the L2 layer and the L3 layer will be triggered to make the data fall to the L3 layer, and so on. When the data of the L0 layer falls to the L layer, T×L times of the Compaction have been performed. If the write amplification is allocated to each data block of each layer, the write amplification during the Compaction process of the RocksDB is:

$$O\left(\frac{T}{N}\right) + O\left(\frac{T}{N}\right) + \ldots + O\left(\frac{T}{N}\right) = O\left(\frac{T*L}{N}\right)$$

For the variable-length SST file, only 1/T of the data block will be changed on average for each Compaction and the write amplification of the present disclosure is:

$$O\left(\frac{T}{N}*\frac{1}{T}\right) + O\left(\frac{T}{N}*\frac{1}{T}\right) + \ldots + O\left(\frac{T}{N}*\frac{1}{T}\right) = O\left(\frac{L}{N}\right)$$

Through theoretical analysis, the write magnification of the present disclosure may be reduced by T times compared with the write magnification of the original LSM-based database system.

Figure 10:
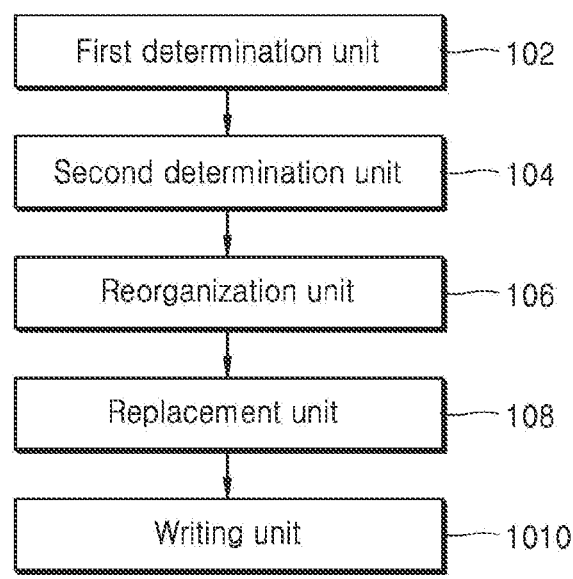
FIG. 10 is a block diagram illustrating a storage device, according to an exemplary embodiment of the present disclosure.

According to another aspect of exemplary embodiments of the present disclosure, a storage device is applied to the storage apparatus of the above-mentioned embodiments. Referring to FIG. 10, the storage device includes: a first determination unit 102, a second determination unit 104, a reorganization unit 106, a replacement unit 108, and a writing unit 1010.

Before proceeding, it should be clear that Figures herein, including FIG. 10, show and reference circuitry with labels such as "unit", "circuit" or "block". As is traditional in the field of the inventive concept(s) described herein, examples may be described and illustrated in terms of units, circuits and blocks which carry out a described function or functions. These units, circuits and blocks, which may be referred to herein as a first determination unit, a second determination unit, a reorganization unit, a replacement unit a writing unit, or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a unit, circuit or block may be implemented by dedicated hardware, or by a processor (e.g., one or more programmed microprocessors and associated circuitry), or by a combination of dedicated hardware to perform some functions of the unit, circuit or block and a processor to perform other functions of the unit, circuit or block. Each unit, circuit or block of the examples may be physically separated into two or more interacting and discrete circuits or blocks without departing from the scope of the present disclosure. Likewise, the units, circuits and blocks of the examples may be physically combined into more complex units, circuits, and blocks without departing from the scope of the present disclosure.

The first determination unit 102 is configured to determine layers that need to be merged in a database. The second determination unit 104 is configured to determine a data block that needs to be modified based on files of the layers that need to be merged. The reorganization unit 106 is configured to read a corresponding data block in the memory and reorganize the read data block, according to the key corresponding to the data block that needs to be modified. The replacement unit 108 is configured to replace the data block that needs to be modified in the memory with the reorganized data block, when byte size of the reorganized data block does not exceed a first preset value. The writing unit 1010 is configured to store the key and statistical information of the reorganized data block in a corresponding file of the database.

In an embodiment of the present disclosure, the replacement unit 108 is further configured to split the reorganized data block according to the first preset value, when the byte size of the reorganized data block exceeds the first preset value, and replace the data block that needs to be modified in the memory with the split data block. The writing unit is further configured to store the key and the statistical information of the split data block in the corresponding file of the database.

In an embodiment of the present disclosure, the writing unit 1010 is further configured to judge, after storing the key and the statistical information of the reorganized data block in the corresponding file of the database, whether the byte size of all data blocks of the corresponding file exceeds a second preset value. When a result of the judging is yes, the writing unit 1010 is configured to split the corresponding file according to the second preset value, and store the key and the statistical information of the reorganized data block and the key and the statistical information of a unmodified data block of the corresponding file respectively in the split file in the order of the keys. When the result of the judging is no, the writing unit 1010 is configured to store the key and the statistical information of the reorganized data block in the corresponding file.

In an embodiment of the present disclosure, the first determination unit 102 is further configured to detect that the files in the database increase. The first determination unit 102 is also configured to acquire the byte size of each layer in the database and determine (e.g., identify) a former layer with a byte size exceeding a byte threshold. The first determination unit 102 is further configured to determine the former layer and a latter layer as the layers that need to be merged. The latter layer is a next layer adjacent to the former layer.

In an embodiment of the present disclosure, the first determination unit 102 is further configured to determine that the files in the database increase, when the byte size of written data exceeds a first predetermined threshold.

In an embodiment of the present disclosure, the second determination unit 104 is further configured to: acquire the file with a largest file byte size and a predetermined file in a former layer that need to be merged. The predetermined file is the file in the former layer containing a user key of the file with a largest file byte size, and the user key is contained in the key corresponding to the data block in the file. The second determination unit 104 is configured to obtain a user key range based on the user key of the file with the largest file byte size and a user key of the predetermined file. The second determination unit 104 is also configured to acquire the data block in the latter layer of the layers that need to be merged, with a user key overlapping with the user key range, and the data block in the former layer of the layers that need to be merged, with a user key overlapping with the user key range. The second determination unit 104 is also configured to determine the data block with a user key overlapping with the user key range as the data block that needs to be modified.

In an embodiment of the present disclosure, the reorganization unit 106 is further configured to read the corresponding data block in the memory according to a user key corresponding to the data block that needs to be modified. The user key is contained in the key corresponding to the data block. The reorganization unit 106 is configured to select data corresponding to a largest serial number corresponding to each user key from the corresponding data block, where the serial number is contained in the key corresponding to the data block and is used to indicate an order in which the same user key appears. The reorganization unit 106 is also configured to use, the selected data after being sorted according to the user key, as the reorganized data block.

According to yet another aspect of exemplary embodiments of the present disclosure, a storage system including a memory, a database, and the storage device described as in the above embodiments. The memory is configured to store a data block, and the database is configured to store key and statistical information of the data block. The statistical information includes information related to the reorganization of data blocks, such as the byte size, the byte threshold, and so on.

The above-described embodiments of the present disclosure provide a storage system and storage method. For example, the above-described embodiments provide a solution for optimizing the RocksDB based on the new storage hardware KV SSD, in which the data block in a SST file of the RocksDB may be stored in the KV SSD, when the data size changes within a certain range, the performance of the KV SSD randomly reading and writing data is stable. This can ensure the read and write performance of the RocksDB and realize a variable-length SST files. Moreover, the granularity of the Compaction process of the RocksDB is refined, such that being in the unit of the file is refined to being in the unit of the data block, to avoid read, parse, reorganize and rewrite of all the data blocks due to the change of a part of the data blocks in the SST file during the Compaction process. This reduces unnecessary operations and IO consumption, thereby reducing the write amplification and improving the write performance.

In addition, the present disclosure describes optimizations through which the write amplification in the Compaction process of the RocksDB may be reduced from $$o\left(\frac{T*L}{N}\right)$$

to $$o\left(\frac{L}{N}\right),$$

which reduces T times.

It should be understood that each unit/module in the storage method and the storage device according to the exemplary embodiment of the present disclosure may be implemented as a hardware component and/or a software component. A person skilled in the art may implement each unit/module by using a field programmable gate array (FPGA) or an application specific integrated circuit (ASIC) according to the defined processing performed by each unit/module.

According to still another aspect of exemplary embodiments of the present disclosure, a computer-readable storage medium stores a computer program. The computer program, when executed by a processor, implements the storage method described in the present disclosure.

Specifically, the storage method according to an exemplary embodiment of the present disclosure may be implemented using a computer program, code segment, instruction, or any combination thereof. Any computer program, code segment, instruction or combination thereof may be recorded, stored, or fixed in one or more non-transitory computer-readable storage medium(s) or on one or more non-transitory computer-readable storage medium(s). The computer-readable storage medium is any data storage device that may store data read by a computer system. Examples of the computer-readable storage medium include a read-only memory, a random access memory, a read-only optical disk, a magnetic tape, a floppy disk, an optical data storage device, and a wired or wireless transmission path through the Internet.

According to another aspect of the exemplary embodiments of the present disclosure, an electronic apparatus includes at least one processor and at least one memory storing computer-executable instructions. The computer-executable instructions, when executed by the at least one processor, cause the at least one processor to execute the storage method described in the present disclosure.

Specifically, the electronic apparatus may broadly be a tablet computer, a smart phone, a smart watch, or any other electronic device with necessary computing and/or processing capabilities. In an embodiment, the electronic apparatus may include a processor, a memory, a network interface, a communication interface, etc. connected through a system bus. The processor of the electronic apparatus may be used to provide the necessary calculation, processing and/or control capabilities. The memory of the electronic apparatus may include a non-volatile storage medium and an internal memory. An operating system, computer programs, etc. may be stored in or on the non-volatile storage medium. The internal memory may provide an environment for the operation of the operating system and the computer programs in the non-volatile storage medium. The network interface and the communication interface of the electronic apparatus may be used to connect and communicate with an external apparatus through the network.

Exemplary embodiments of the present disclosure have been described above, and it should be understood that the foregoing description is only exemplary and not exhaustive, and the present disclosure is not limited to the disclosed exemplary embodiments. Many modifications and alterations are obvious to those of ordinary skill in the art without departing from the scope and spirit of the present disclosure. Therefore, the protection scope of the present disclosure should be subject to the scope of the claims.

What is claimed is:

1. A storage method, comprising:
   determining layers that are to be merged in a database;
   determining a data block that is to be modified based on files of the layers that are to be merged, each of the files including a plurality of data blocks, the data block that is to be modified being from among the plurality of data blocks;
   reading a corresponding data block in a memory and reorganizing the read data block, according to a key corresponding to the data block that is to be modified;
   when a byte size of the reorganized data block exceeds a first preset value;
   splitting the reorganized data block according to the first preset value;
   replacing the data block that is to be modified in the memory with the split data block; and
   storing the key and statistical information of the split data block in a corresponding file of the database.

2. The storage method according to claim 1, wherein after storing the key and the statistical information of the split data block in the corresponding file of the database, the method further comprises:
   judging whether a byte size of all data blocks of the corresponding file exceeds a second preset value;
   when a result of the judging is yes, splitting the corresponding file according to the second preset value, and storing the key and the statistical information of the reorganized data block and the key and the statistical information of an unmodified data block of the corresponding file respectively in the split file in an order of the keys; and
   when the result of the judging is no, storing the key and the statistical information of the reorganized data block in the corresponding file.

3. The storage method according to claim 1, wherein said determining the layers that are to be merged in the database comprises:
   detecting that the files in the database increase;
   acquiring a byte size of each layer in the database;

determining a layer with a byte size exceeding a byte threshold of a corresponding layer as a former layer; and determining the former layer and a latter layer as the layers that are to be merged, wherein the latter layer is a next layer adjacent to the former layer.

4. The storage method according to claim 3, wherein said detecting that the files in the database increase comprises:

determining that the files in the database increase when a byte size of written data exceeds a first predetermined threshold.

5. The storage method according to claim 1, wherein said determining the data block that is to be modified based on files of the layers that are to be merged comprises:

acquiring a file with a largest file byte size and a predetermined file in a former layer that are to be merged, wherein the predetermined file is the file in the former layer containing a user key of the file with a largest file byte size, and the user key is contained in the key corresponding to the data block in the file;

obtaining a user key range based on the user key of the file with the largest file byte size and a user key of the predetermined file;

acquiring a data block in a latter layer of the layers that are to be merged, with a user key overlapping with the user key range, and a data block in the former layer of the layers that are to be merged, with a user key overlapping with the user key range; and determining the data block with the user key overlapping with the user key range as the data block that is to be modified.

6. The storage method according to claim 1, wherein said reading the corresponding data block in the memory and reorganizing the data block, according to the key corresponding to the data block that is to be modified, comprises:

reading the corresponding data block in the memory according to a user key corresponding to the data block that is to be modified, wherein the user key is contained in the key corresponding to the data block;

selecting data corresponding to a largest serial number corresponding to each user key from the corresponding data block, where the serial number is contained in the key corresponding to the data block and is used to indicate an order in which the same user key appears; and using the selected data after being sorted according to the user key as the reorganized data block.

7. A storage device, comprising:
a first determination unit configured to determine layers that are to be merged in a database;
a second determination unit configured to determine a data block that is to be modified based on files of the layers that are to be merged, each of the files including a plurality of data blocks, the data block that is to be modified being from among the plurality of data blocks;
a reorganization unit configured to read a corresponding data block in a memory and reorganize the read data block, according to a key corresponding to the data block that is to be modified;
a replacement unit configured to split the reorganized data block according to a first preset value and to replace the data block that is to be modified in the memory with the split data block, when a byte size of the reorganized data block exceeds the first preset value; and a writing unit configured to store the key and statistical information of the reorganized split data block in a corresponding file of the database.

8. The storage device according to claim 7, wherein the writing unit is further configured to: judge, after storing the key and the statistical information of the split data block in the corresponding file of the database, whether a byte size of all data blocks of the corresponding file exceeds a second preset value; when a result of the judging is yes, split the corresponding file according to the second preset value, and store the key and the statistical information of the reorganized data block and the key and the statistical information of an unmodified data block of the corresponding file respectively in the split file in an order of the keys; and when the result of the judging is no, store the key and the statistical information of the reorganized data block in the corresponding file.

9. The storage device according to claim 7, wherein the first determination unit is further configured to: detect that the files in the database increase; acquire a byte size of each layer in the database; determine a layer with a byte size exceeding a byte threshold of a corresponding layer as a former layer; and determine the former layer and a latter layer as the layers that are to be merged, wherein the latter layer is a next layer adjacent to the former layer.

10. The storage device according to claim 9, wherein the first determination unit is further configured to determine that the files in the database increase, when a byte size of written data exceeds a first predetermined threshold.

11. The storage device according to claim 7, wherein the second determination unit is further configured to: acquire a file with a largest file byte size and a predetermined file in a former layer in the layers that are to be merged, wherein the predetermined file is the file in the former layer containing a user key of the file with a largest file byte size, and the user key is contained in the key corresponding to the data block in the file; obtain a user key range based on the user key of the file with the largest file byte size and a user key of the predetermined file; acquire a data block in a latter layer of the layers that are to be merged, with a user key overlapping with the user key range, and a data block in the former layer of the layers that are to be merged, with a user key overlapping with the user key range; and determine the data block with the user key overlapping with the user key range as the data block that is to be modified.

12. The storage device according to claim 7, wherein the reorganization unit is further configured to:

read the corresponding data block in the memory according to a user key corresponding to the data block that is to be modified, wherein the user key is contained in the key corresponding to the data block;

select data corresponding to a largest serial number corresponding to each user key from the corresponding data block, where the serial number is contained in the key corresponding to the data block and is used to indicate an order in which the same user key appears; and use the selected data after being sorted according to the user key as the reorganized data block.

13. A storage system, comprising:
a memory,
a database, and
the storage device according to claim 7, wherein the memory is configured to store the data block and the reorganized data block, and the database is configured to store the key and the statistical information of the data block and the reorganized data block.

14. A computer-readable storage medium storing a computer program, wherein the computer program, when executed by a processor, implements the storage method according to claim 1.

15. An electronic apparatus, comprising:
at least one processor; and
at least one memory storing computer-executable instructions,
wherein, the computer-executable instructions, when executed by the at least one processor, cause the at least one processor to execute a storage process, comprising:
determining layers that are to be merged in a database;
determining a data block that is to be modified based on files of the layers that are to be merged, each of the files including a plurality of data blocks, the data block that is to be modified being from among the plurality of data blocks;
reading a corresponding data block in a memory and reorganizing the read data block, according to a key corresponding to the data block that is to be modified;
splitting the reorganized data block according to a first preset value and replacing the data block that is to be modified in the memory with the split data block, when a byte size of the reorganized data block exceeds the first preset value; and
storing the key and statistical information of the split data block in a corresponding file of the database.

16. The electronic apparatus according to claim 15, wherein the storage process executed when the processor executes the computer-executable instructions further comprises:
judging whether a byte size of all data blocks of the corresponding file exceeds a second preset value;
when a result of the judging is yes, splitting the corresponding file according to the second preset value, and storing the key and the statistical information of the reorganized data block and the key and the statistical information of an unmodified data block of the corresponding file respectively in the split file in an order of the keys; and
when the result of the judging is no, storing the key and the statistical information of the reorganized data block in the corresponding file.

17. The electronic apparatus according to claim 15, wherein the storage process executed when the processor executes the computer-executable instructions further comprises:
detecting that the files in the database increase;
acquiring a byte size of each layer in the database;
determining a layer with a byte size exceeding a byte threshold of a corresponding layer as a former layer; and
determining the former layer and a latter layer as the layers that are to be merged, wherein the latter layer is a next layer adjacent to the former layer.

* * * * *